United States Patent
Rust et al.

(10) Patent No.: US 7,326,312 B1
(45) Date of Patent: Feb. 5, 2008

(54) PROCESS FOR LAYING FIBER TAPE

(75) Inventors: Ralph John Rust, Hamilton County, OH (US); Michael North Grimshaw, Clermont County, OH (US); James Richard Hecht, Warren County, OH (US)

(73) Assignee: MAGUS Intellectual Property GmbH (CH)

( * ) Notice: Subject to any disclaimer, the term of this patent is extended or adjusted under 35 U.S.C. 154(b) by 123 days.

(21) Appl. No.: 10/936,964

(22) Filed: Sep. 9, 2004

(51) Int. Cl.
*B32B 37/00* (2006.01)
(52) U.S. Cl. .................. 156/234; 156/235; 156/238; 156/248; 156/257; 156/270
(58) Field of Classification Search ............. 156/512, 156/523, 234, 235, 238, 257, 270, 297, 540, 156/541, 248
See application file for complete search history.

(56) References Cited

U.S. PATENT DOCUMENTS

| | | | |
|---|---|---|---|
| 4,557,783 A | 12/1985 | Grone et al. | |
| 4,560,433 A * | 12/1985 | Frank | 156/459 |
| 4,799,981 A * | 1/1989 | Stone et al. | 156/64 |
| 4,978,417 A | 12/1990 | Grimshaw et al. | |
| 5,114,519 A | 5/1992 | Grimshaw et al. | |
| 5,115,993 A | 5/1992 | Grimshaw et al. | |
| 5,314,563 A | 5/1994 | Grimshaw et al. | |
| 5,316,612 A | 5/1994 | Peterson et al. | |
| 5,352,306 A | 10/1994 | Grimshaw et al. | |
| 5,738,749 A | 4/1998 | Grimshaw et al. | |

* cited by examiner

*Primary Examiner*—James Sells
(74) *Attorney, Agent, or Firm*—Reising, Ethington, Barnes, Kisselle, P.C.

(57) ABSTRACT

The process for laying a non-full width course of fiber composite tape in a part is designed to ensure that all of the scrap portion of the tape surrounding the non-full width course is deposited in the scrap area and not in the part. An extra cut is made in tape downstream of the non-full width course, between the non-full width course and next course. After the tape head attempts to lay the scrap in the scrap area in the forward direction, the tape head makes a pass in the scrap area with the tape feed and the tape head moving in the reverse direction, and the scrap is laid beginning from the portion of the tape having the extra cut, and progressing to the non-full width course. The method may be used to remove scrap from around non-full width courses having any shape.

19 Claims, 6 Drawing Sheets

Lay Tape With
Head Moving Backward

Move Forward
Slack In Tape

Fold In Tape
Roller Moving Forward

PROCESS FOR LAYING FIBER TAPE

FIELD OF THE INVENTION

The invention relates to processes for ensuring the removal of scrap portions of fiber tape between courses of tape that are to be laid in a part by a computer controlled tape laying machine.

BACKGROUND OF THE INVENTION

The use of fiber composite tape laying machines for the manufacture of fiber composite parts is well known in the art. Such machines comprise a tape laying head mounted on the end of a cantilever arm that is supported for complex motion in order to apply fiber tape to a form or tool in order to create a part. The head normally travels in one direction along the tool and applies the fiber tape to the tool as it moves across the surface of the tool. The fiber tape comprises a resin matrix in which are embedded bundles of carbon fiber. The fiber tape is applied to a carrier layer of backing paper that is coated with a release agent. A feed reel on the head provides a supply of tape, and a take-up reel is provided to take up the backing paper after the fiber tape has been laid onto the part. Both reels are positively driven by reversible variable speed torque motors that are operated to maintain tension in the tape during the tape laying process. The drive of the tape is referred to as the U-axis of the machine, and although the reels are driven by the motors, the speed of deposition of the tape on the part is slightly greater than the speed that the tape comes off of the feed reel in order to maintain a positive tension in the tape during operation.

A compaction shoe on the head applies pressure to the backing paper to press the tape onto the part. The line of contact between the compaction shoe and the backing paper is called the line of compaction or the laydown line. As the fiber tape is pressed into the part at the laydown line the backing paper is separated from the fiber tape and proceeds along a tape path to the take-up reel. The head also includes a roller for pressing the fiber tape onto the part. The roller is mounted on a movable support and is normally out of contact with fiber tape while the tape is being pressed onto the part by the shoe. The roller is normally used to press the tail of a course of fiber tape onto the part, and for this reason is also called a tail compactor. The term "tail" refers to a less than full-width tapered end of a course of fiber tape. Movement of the roller into contact with the fiber tape causes the shoe to retract from pressing engagement with the tape. The roller is positioned on the head so that it does not press on the fiber tape through the backing paper, it presses directly on fiber tape after the backing paper has been stripped from the fiber tape. After the roller is interchanged with the shoe, the laydown line of the roller is at the same position as the laydown line of the shoe. Whether the compaction shoe or the roller is used to lay the fiber tape, the tape head always moves forward, from upstream to downstream on the tool or part, and with the feed reel leading the take-up reel. Although the tape head lays tape in the part while traveling back and forth across the part, the head reverses its orientation 180 degrees on the cantilever arm in order to do so. As a result, the tape head never lays fiber tape while moving from downstream to upstream on the part, or with the take-up reel leading the feed reel.

The head also includes a heater for heating the resin just before it is applied to the tool or the part. The entire operation of the tape laying machine is under CNC control. U.S. Pat. Nos. 4,557,783, 5,314,563, and 5,352,306, all presently assigned to the assignee of the present invention, disclose in greater detail composite tape laying heads as described above.

The fiber composite tape itself is used in discrete widths Common nominal tape widths presently used include 75 mm, 150 mm, 300 mm, 3 inch, 6 inch, and 12 inch, but other widths are possible. As a result, the laying up of an aircraft component such as a control surface or a wing requires many passes of the tape head over the part, and several hours of time. In order to manufacture a part to the exacting standards required by the aircraft industry, the angle on the end of the tape has to be cut to exactly match the angle on the edge of the part to which the tape is being applied. The tape head contains a knife cutter and a suitable mechanism is provided on the tape head to cut the tape end to any desired angle. Trimming the tape end to the desired angle may produce a section of tape that is scrap. The scrap must be removed from the tape so that it will not be laid in the part. To remove the scrap, the normal procedure is to maneuver the tape head to a scrap area where the scrap can be removed from the backing paper by depositing it in the scrap area. The tape head is then returned to the part and the freshly trimmed tape end is laid on the edge of the tool or part in position to begin to lay the next course of tape. Since the tape laying machine is under computer control, once the shape of the part and the desired tape courses have been programmed into the computer, the tape laying machine can run for several hours without operator intervention.

The tape pattern that is to be laid on the part may require the use of a length or course of tape that has a width that is less that the full width of the tape. Such a tape course is called a non-full width course. Non-full width courses present special problems. A fractional width of the tape adjacent to the non-full width course has to be removed from the backing paper by being laid in the scrap area in order to form the non-full width course. U.S. Pat. Nos. 4,978,417, 5,114,519 and 5,115,993 are directed to methods and apparatus for removing scrap from around non-full width courses. At times, scrap that is supposed to be laid in the scrap area remains on the backing paper and ends up getting laid in the part. Other times, the non-full width course is prematurely removed from the backing paper with the scrap and is laid in the scrap area, and does not get laid in the part. Either event causes a manufacturing defect in the part which may render the part unsafe.

Accordingly, it would be desirable to develop a reliable process for removing scrap portions from fiber tape to ensure that the scrap is removed from the tape in the scrap area and not deposited in the part.

OBJECTS OF THE INVENTION

It is accordingly an object of the invention to provide a method for reliably removing scrap sections of tape between courses of tape so that the scrap sections of tape may be successfully deposited in a scrap area.

It is another object of the invention to provide a method to make scrap removal more reliable when laying a non-full width course of tape so that the scrap portion of tape is laid in the scrap area and not in the part.

It is another object of the invention to provide a method to make scrap removal more reliable when laying a triangular or parallelogram shaped non-full width course of tape so that the scrap portion of tape following the non-full width portion is laid in the scrap area and the non-full width portion is laid in the part.

These and other objects of the invention will be apparent from the following detailed description in which reference numerals used throughout the description refer to like or corresponding parts on the drawing figures:

BRIEF SUMMARY OF THE INVENTION

In accordance with the invention, removal of the scrap portion of tape, either between two courses of tape or surrounding a non-full width course, is ensured by making an extra cut in the scrap portion of tape that is located between the two courses of tape. During the process of depositing the scrap tape in the scrap area, the tape head is moved in the reverse direction and the tape is driven in the reverse direction so that the scrap portion is laid in the reverse direction, from downstream to upstream, and from the region of the extra cut in the tape.

DETAILED DESCRIPTION OF THE INVENTION

Figure 1:
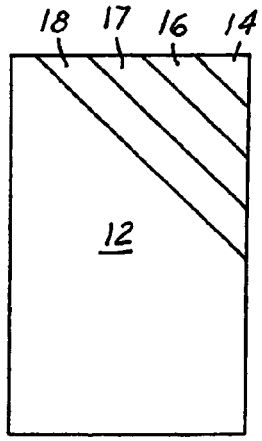
FIG. 1 shows a typical pattern for laying fiber tape on a part.

Turning now to the drawing figures, FIG. 1 shows a typical pattern used to lay fiber tape on a part 12. The first course of tape 14 is laid in the corner of the part and has the shape of a triangle. The second course of tape 16 is laid adjacent to the first course 14, and has the shape of a trapezoid; the third and fourth courses of tape 17 and 18 are laid adjacent to the immediately preceding course, and have the shape of a trapezoid. Additional courses of tape (not shown) are laid on the part until the entire surface of the part is covered. A second layer of tape is then applied over the first layer of tape using the same process. The second layer of tape is often applied at an angle of 30 degrees or more to the first layer of tape in order to increase the strength of the resulting part. Additional layers of tape are applied to the previous layers until the laminated structure reaches the desired thickness. Often hundreds of layers may be required to form the desired fiber composite part.

Figure 2:
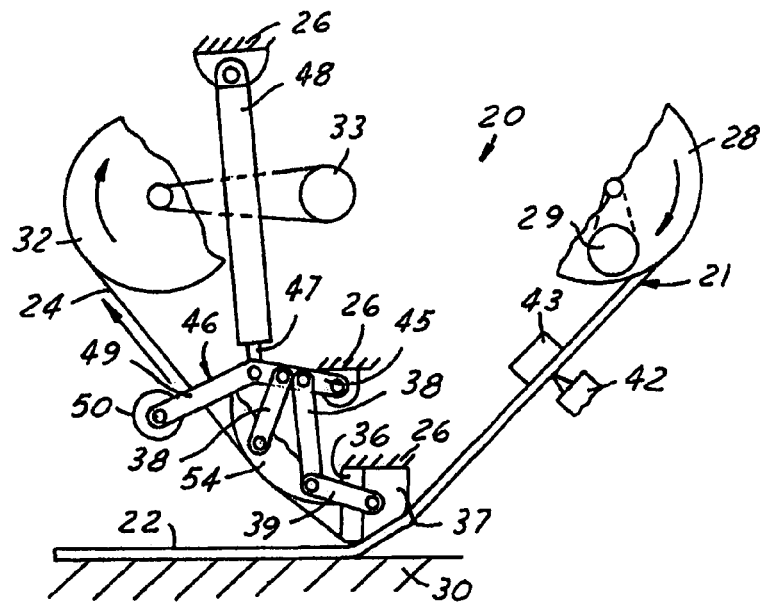
FIG. 2 is a side view of a tape laying head showing the compaction shoe in the lowered position and the compaction roller in the raised position.
Figure 3:
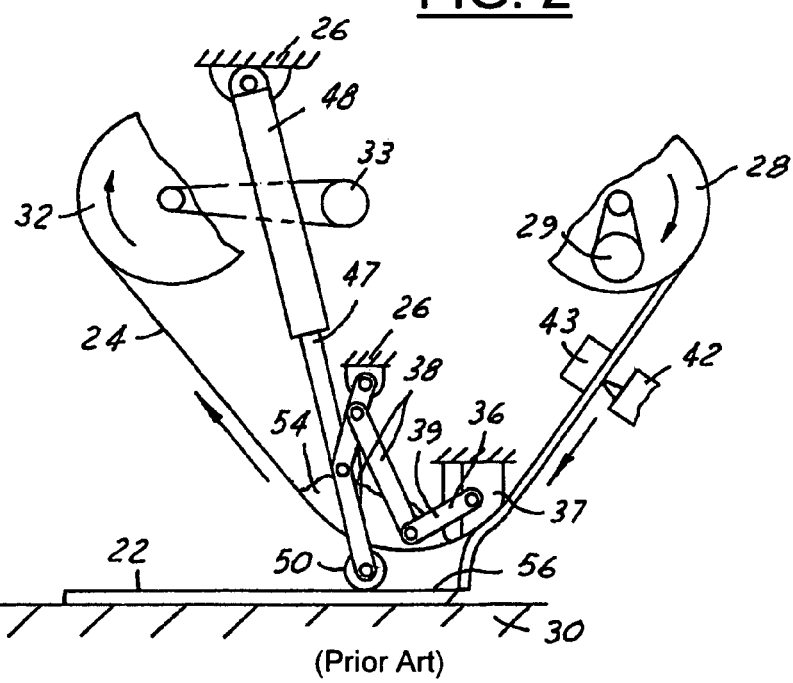
FIG. 3 is a side view of the tape laying head of FIG. 2 but showing the compaction shoe in the raised position and the compaction roller in the lowered position.

FIGS. 2 and 3 show a side view of a typical tape laying head 20 as disclosed in the prior US patents cited above. The term "tape" refers to bundles of carbon fiber embedded in a resin matrix as described above which is carried on a backing paper. The tape head 20 comprises a support frame 26 on which are mounted a feed reel 28 for supplying tape 21 to the part 30 and a take up reel 32 for winding up the backing paper 24 that remains after the fiber tape 22 has been laid on the part 30. The feed reel 28 and the take-up reel 32 are provided with motor drives 29 and 33 respectively, such as reversible variable speed motors, which are used to drive the tape 21 as the fiber tape 22 is laid in the part. A compaction shoe 36 is positioned at the lower end of the tape head 20, and is adjacent to a tape guide 37. The tape path from the feed reel 28 leads the tape between a cutter knife 42 and a cutter block 43 so that cuts can be made in the fiber tape 22 as required. The tape 21 is oriented on the feed reel 28 so that the backing paper 24 is facing the cutter block 43, and the fiber tape 22 is facing the cutter knife 42. The cutter knife 42 is designed to cut through the fiber tape 22, but not through the backing paper 24. As a result, the fiber tape 22 may be cut to create a tape end, and the backing paper 24 remains integral between the feed reel 28 and the take-up reel 32. As the tape 21 passes under the compaction shoe 36, the backing paper 24 is in contact with the shoe, and the fiber tape 22 is in contact with the part 30. Thus, the compaction shoe 36 applies pressure to the tape 21 through the backing paper 24 to press the fiber tape 22 carried by the backing paper 24 onto the part. The backing paper 24 winds around the lower portion of the compaction shoe 36 and travels upward along a backing guide 54 to the take-up reel 32 where it is wound up and eventually discarded. The backing guide 54 forms a part of the path for the backing paper 24 between the compaction shoe 36 and the take-up reel 32.

The backing guide 54 is attached by two drive links 38 to one end 45 of an actuator arm 46 and by a control link 39 to the tape guide 37. The actuator arm 46 is mounted on end of a plunger 47. The plunger 47 is actuated by a cylinder 48 that is mounted on the frame 26. The other end of the actuator arm 46 supports a compaction roller or tail compactor 50. The compaction roller 50 is shown FIG. 2 in the raised position, out of contact with the fiber tape 22. FIG. 2 shows the normal arrangement and location of the tape head elements when the head is laying fiber tape 22 on a part. The head shown in FIG. 2, and in FIG. 3 described below, moves in the forward direction, from left to right, as it lays fiber tape in a part.

FIG. 3 shows the movable elements of the tape laying head 20 after the cylinder 48 has been actuated. The movement of the plunger 47 lowers the compaction roller 50 into contact with the fiber tape 22, and lowers the backing guide 54 so that the shoe no longer presses the fiber tape 22 into contact with the part 30. Although the roller 50 in the lowered position presses the fiber tape 22 into the part, the roller does not press on the tape through the backing paper 24, since the backing paper 24 is in contact with the backing guide 54 and the compaction roller 50 is located between the fiber tape 22 and the backing paper 24. This is the normal arrangement and location of the tape head elements when laying the tail 56 of a course of fiber tape on a part. A tail is normally formed when the end of a course of tape has to be cut at an angle other than 90 degrees to the longitudinal axis of the tape.

Figure 3A:
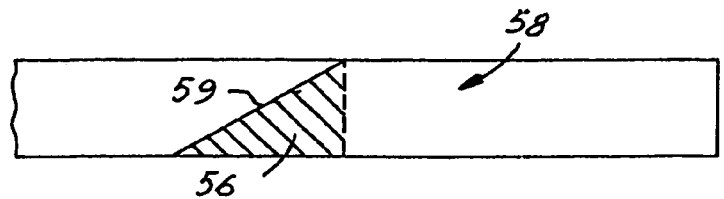
FIG. 3A is a top view of a section of tape that is cut to form a tail.

FIG. 3A is a plan view of a tail 56 formed on the end of a tape course 58 by a diagonal cut 59 made through the thickness of fiber tape.

Figure 4:
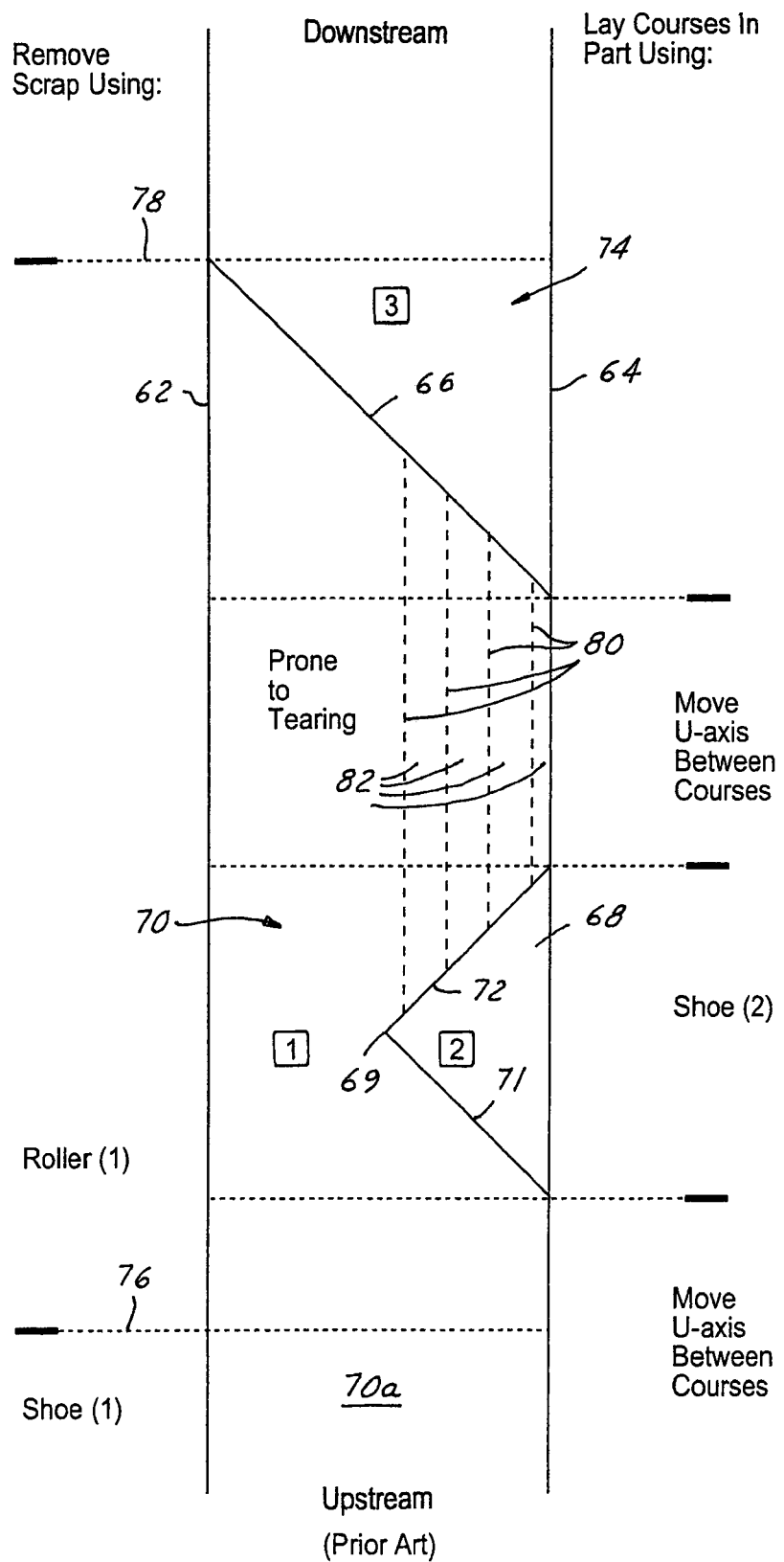
FIG. 4 shows a prior art process of laying a triangle shaped non-full width course of fiber tape.
Figure 5:
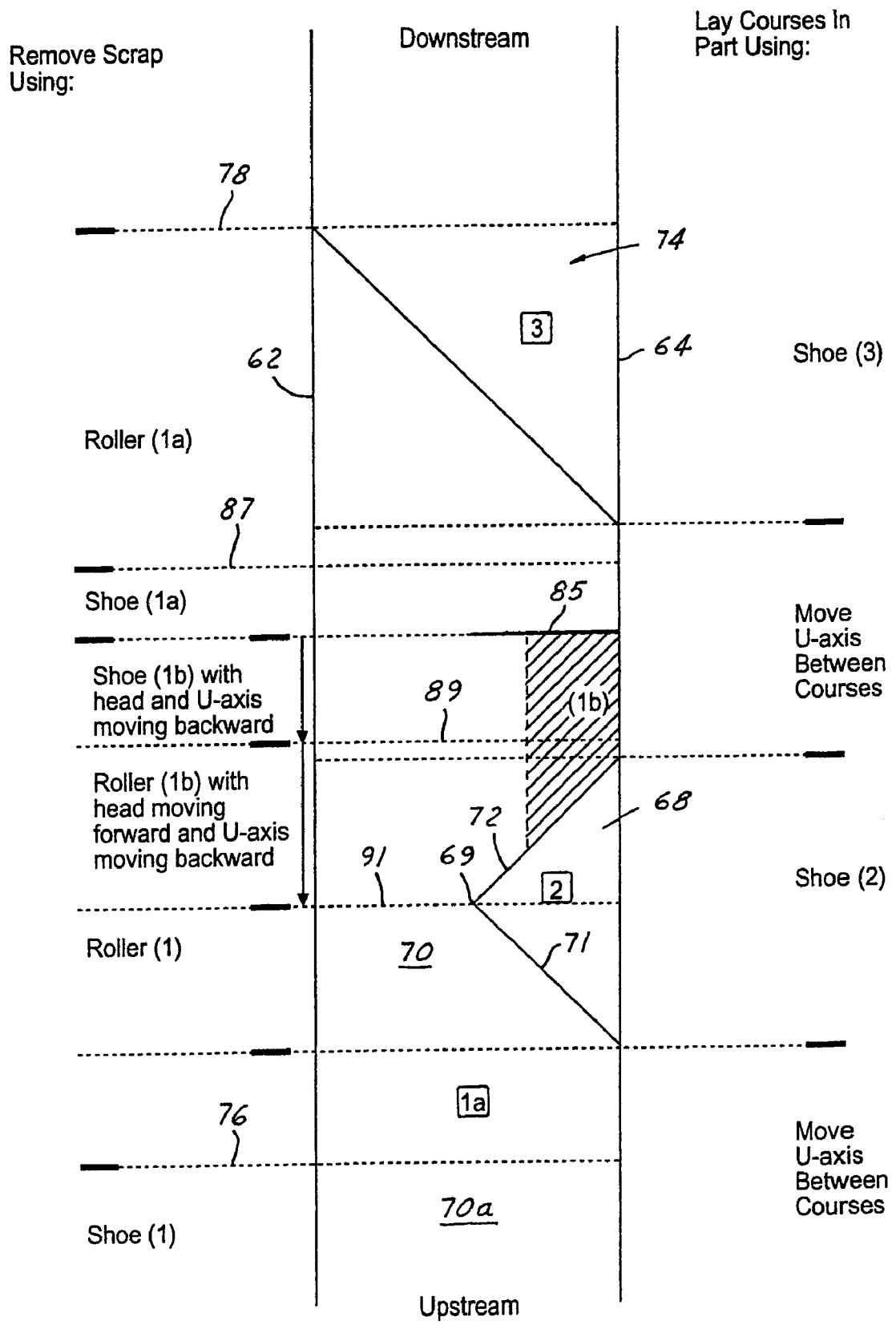
FIG. 5 shows a process for removing the scrap from around and laying a triangle shaped non-full width course of fiber tape according to the invention.
Figure 6:
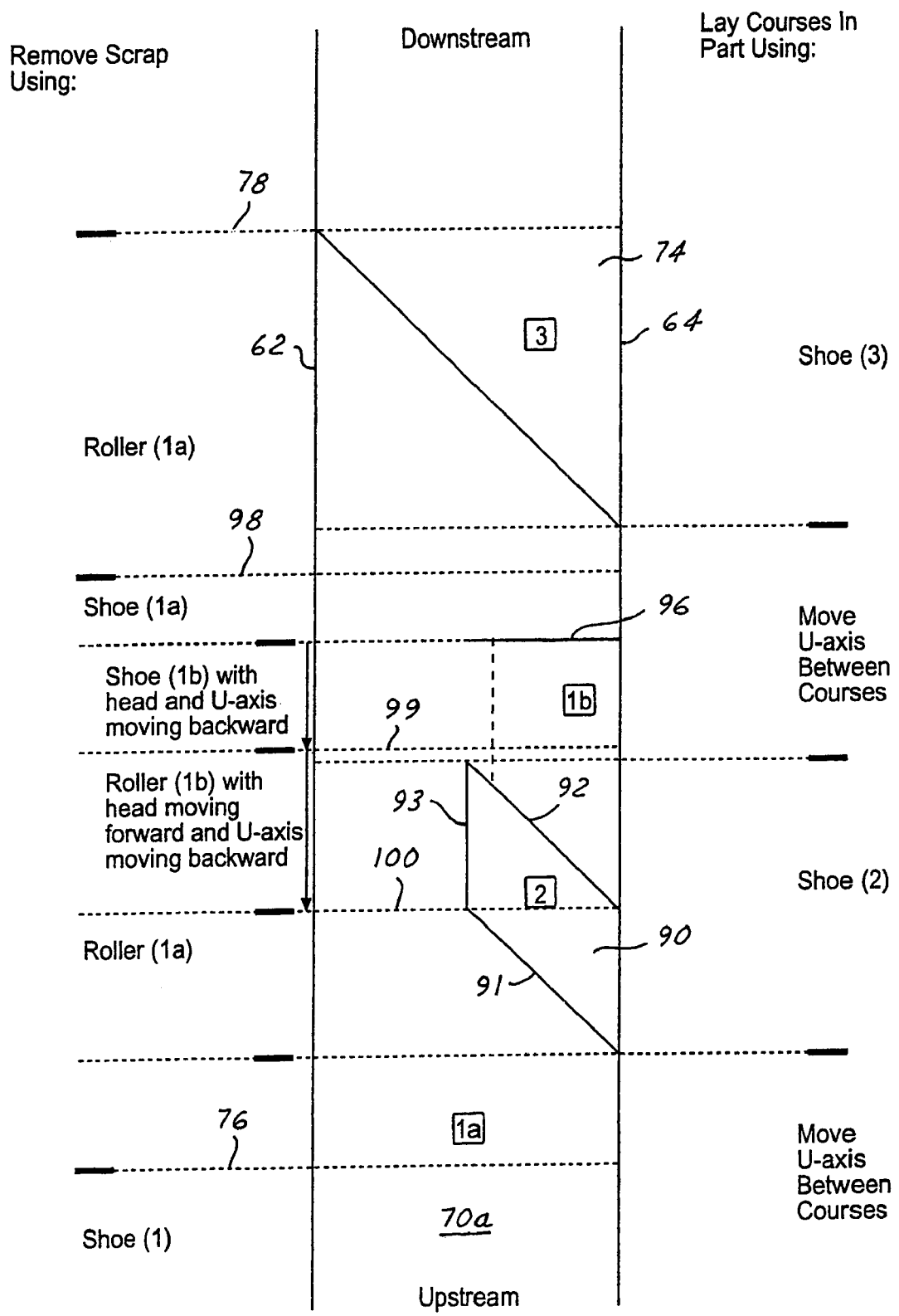
FIG. 6 shows a process for removing the scrap from around and laying a parallelogram shaped non-full width course of fiber tape according to the invention.
Figure 7:
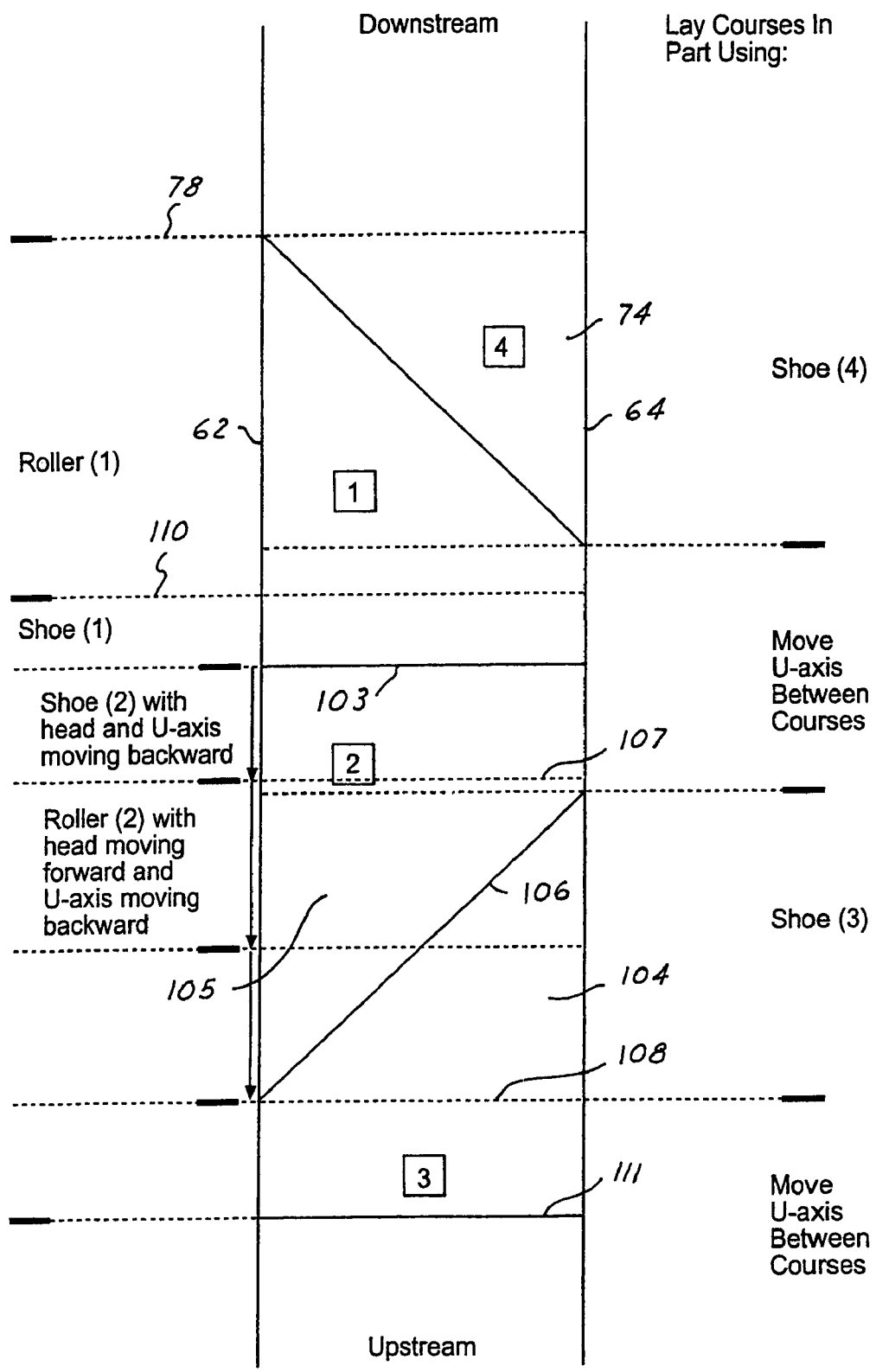
FIG. 7 shows a process for removing the scrap from between two full width courses of tape, the upstream one of which is too short to enable the use of a tail compactor.

FIGS. 4-6 show processes for removing scrap from around a non-full width course and for laying a non-full width course in a part. In FIGS. 4-6, the tape edges are represented by the two vertical lines 62 and 64. Cuts through the resin and fiber layer are represented by the solid lines within the edges of the tape. The tape is laid from the bottom of the drawing toward the top of the drawing or from the upstream portion of the tape, to the downstream portion. FIGS. 4-6 all show a non-full width course followed by a full width course with a 45 degree beginning cut 66. FIG. 7 shows two full width courses separated by a scrap course. In FIGS. 4-7, the numbers in the squares indicate the order in which the courses are laid. The scrap portion before and surrounding the non-full width course is always course number 1 in FIGS. 4-6. The left side of the drawings are labeled to show which parts of the scrap courses are laid with the shoe and what parts are laid with the roller. The right side of the drawings are labeled to show which parts of the courses laid in the part are laid with the shoe and what parts are laid with the roller. The numbers in parenthesis next to the labels "Roller" and "Shoe" designate the course number that the roller or shoe is associated with. The horizontal dashed lines show the points on the tape where the use of the roller or shoe begins and ends. The vertical dashed lines show lines along which the tape is prone to separate or tear as it is being laid.

Referring now specifically to FIG. 4, the drawing shows the prior art method of laying a triangular non-full width course, similar to the course 14 shown in FIG. 1, in a part. The triangular non-full width section 68 is precut from the surrounding tape 70 along the two lines 71 and 72. The surrounding tape 70 that is upstream, downstream and alongside of the triangular section is scrap that will be laid in the scrap area. The tape course 74 following the scrap 70 will be laid in the part, as it is not scrap.

Before the triangular section 68 can be laid in the part, the scrap 70 surrounding the triangular section must be removed from the tape. In order to do this, the scrap 70a before the non-full width course 68 is begun to be laid in the scrap area with the shoe as shown in FIG. 2. This allows the entire width of fiber tape to become adhered to the scrap area as it passes under the shoe. When the bottom of the shoe gets to the dotted line 76 and is within a predetermined distance of the non-full width course 68 on the backing paper, the shoe 36 is retracted and the compaction roller or tail compactor 50 on the head is extended as shown in FIG. 3. This allows the roller 50 to press the fiber tape 22 onto the scrap area, but allows the non-full width course 68 to remain on the backing paper as the paper is wound past the backing guide and toward the take up reel. The head moves in the forward direction, from left to right as shown in FIG. 3, while performing this step. Referring to FIG. 4, the scrap around the non-full width course 68 is removed from the backing paper by the roller until the roller reaches the dotted line 78, and is laid in the scrap area. This leaves the triangular non-full width course 68 on the backing paper. The non-full width course 68 is followed by empty backing paper and then the next course.

The head is returned to the part and the paper is repositioned on the head to locate the non-full width course under the shoe. The non-full width course is laid in the part with the shoe with the head configured as shown in FIG. 2. The beginning of the next course 74 is then laid with the shoe.

When using the roller to remove the scrap from around the non-full width course as described above, it is not certain where the scrap ends up. Sometimes, all of the scrap is laid in the scrap area as desired. However, as the scrap is being laid, the tape is prone to tearing along the lines 80 in the direction of fiber orientation following the non-full width course 68. If tearing does occur, some tape of the tape sections 82 do not get laid in the scrap area, since they never come into contact with the roller, and remain on the backing paper. If tape sections 82 remain on the backing paper, the tape sections generally come off of the paper and are laid in the part while the non-full width course 68 is being laid in the part.

The incidence of the occurrence of the problem depends on ambient conditions and tape conditions. The better the tape sticks to the backing paper and the lower the integrity across the width of the tape, the more likely the tape will tear along the lines 80 and a portion of the scrap will end up in the part. It has also been determined that the greater the angle of the trailing cut 72 of the triangular course 68 is from being parallel with the fiber direction in the tape, the more likely that the prior art method will leave scrap on the backing paper that will get laid in the part.

According to the invention, the problem of tearing the tape along the lines 80 and leaving the strips of tape 82 on the paper may be avoided by the process shown in FIG. 5.

The process of FIG. 5 adds one cut and some additional motion of the tape laying head to the prior art method. A partial butt cut 85 is made to the tape between the non-full width course 68 and the next course 74. A butt cut is one which is perpendicular to the longitudinal axis of the tape. The butt cut is partial because it does not extend all of the way across the tape. The butt cut penetrates completely through the fiber and resin layer of the tape, but not through the paper backing. The butt cut extends from the edge 64 of the tape on which the non-full width course 68 is located to a point on the tape that is the same distance from the edge 64 of the tape as the edge of the non-full width course that is the farthest from the tape edge, in this case the apex 69 of the triangular course 68. This method requires a longer length of tape between the downstream end of the non-full width course 68 and the next course 74 than the prior art method.

The process as shown in FIG. 5 proceeds as follows. The scrap 70a before the non-full width course is begun to be laid in the scrap area with the shoe as shown in FIG. 2. When the bottom of the compaction shoe is at the line 76 and is within a predetermined distance of the non-full width course on the backing paper, the shoe is raised and the roller is brought into contact with the tape as shown in FIG. 3. The scrap 70 around the non-full width course is removed from the backing paper up to the end of the head of the next course designated by the dotted line 78. After completing the preceding steps as explained above in conjunction with FIG. 5, since the steps are essentially the same as those shown in FIG. 4, all of the scrap between the non-full width course and the butt cut may or may not have been removed from the backing paper.

Figure 8:
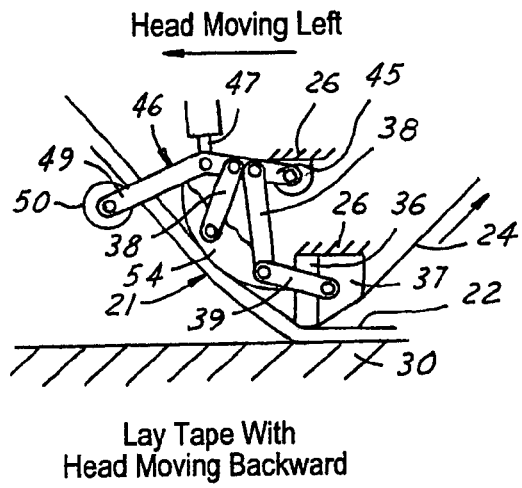
FIG. 8 shows the position of the compaction roller and shoe, and the direction of tape drive, as the tape head lays scrap in the scrap area with the head moving backward.
Figure 10:
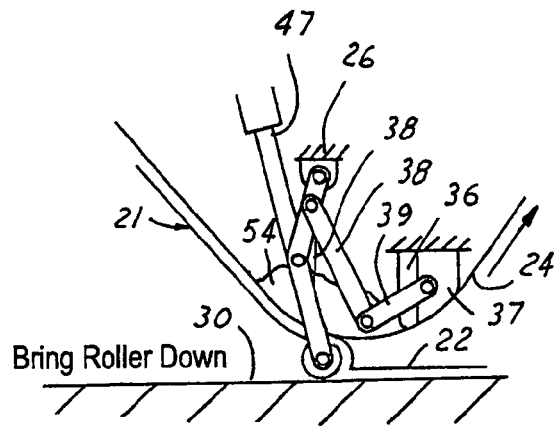
FIG. 10 shows the position of the compaction roller and shoe, and the direction of tape drive, as the roller is extended to have the tape head lay scrap in the scrap area with the head moving forward after laying backward and the tape drive moving backward.
Figure 9:
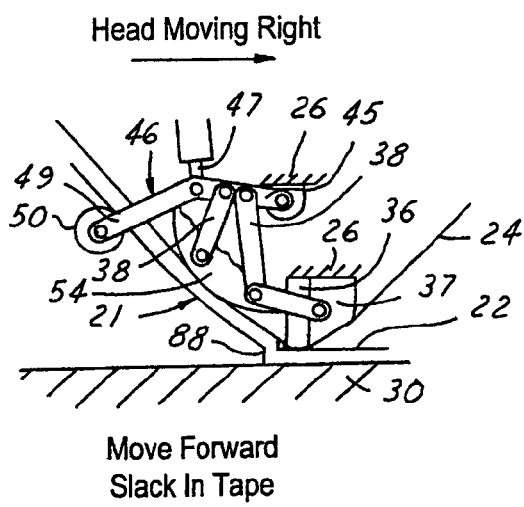
FIG. 9 shows the position of the compaction roller and shoe, and the direction of tape drive, as the tape head lays scrap in the scrap area with the head moving forward after laying backward to put slack in the tape.

To make sure that all of the scrap is removed, a second step is used to lay the scrap after the non-full width course 68 in the scrap area. The roller remains on the surface of the scrap area. The tape is driven backward until the laydown area is at line 87, a predetermined distance from the partial butt cut 85. The shoe is extended and the roller is retracted as shown in FIG. 2. The butt cut 85 between the non-full width course 68 and the next course 74 is now under the shoe. The head begins to lay the scrap with the shoe moving toward the non-full width course 68 from the butt cut, in the reverse direction of the normal direction of motion of the head as shown in FIG. 8. While the head is moving backward in the scrap area, the tape is driven in the negative direction to rewind the backing paper onto the tape feed reel and to deposit the scrap following the non-full width course onto the scrap area. Just before the non-full width course is reached, when the shoe reaches the line 89, the head reverses direction to put slack in the tape. Slack needs to be put in the tape so that the tape 22 is not pulled off of the surface when the compaction roller 50 is brought down onto the surface. The shoe makes a short forward move on the surface without the tape feed axis moving as shown in FIG. 9. This forward movement peels a small amount of tape 88 off of the backing paper on the take-up reel side of the shoe to generate the slack in the tape. The roller is extended and the shoe is retracted as shown in FIG. 10. The tape feed axis is driven backward to remove the slack in the tape and the backing paper on the feed reel side.

Figure 11:
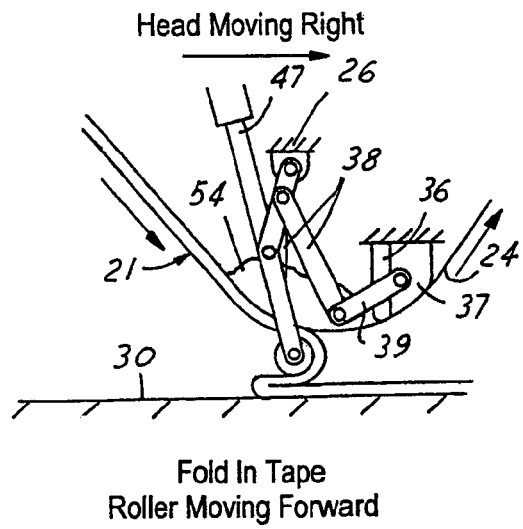
FIG. 11 shows the position of the compaction roller and shoe, and the direction of tape drive, as the tape head lays scrap in the scrap area using the roller with the head moving forward after laying backward, and the tape moving backward.

The head continues to move forward while the tape drive continues in the reverse direction until the laydown line of the roller reaches the line 91 at the apex 69 of the triangle so that all of the backing paper which may have scrap on it has passed under the roller. If the scrap piece is short, the entire scrap piece will pop off of the backing paper when the compaction roller is extended. If the scrap piece is long, the scrap is folded under the compaction roller as shown in FIG. 11. The fold line goes across the tape and the tape doubles back on itself. Once this scrap piece has been placed on the scrap receiving surface, the head lifts off of the surface of the scrap area.

The tape is then driven to position the beginning of the non-full width course 68 under the shoe. The tape laying head is moved to the part and the non-full width course 68 is laid next. The non-full width course is laid with the shoe as well known in the prior art. After the non-full width course 68 is laid, the beginning of the next course 74 is laid with the shoe.

The method described above at one point lays tape backward. As background information, the tape head is not designed to lay tape backward. In spite of this, the tape head is able to lay tape backward with the shoe but not with the roller. When the head is laying tape backward, the tape is on the wrong side of the compaction roller for laying tape. The head needs to move forward to lay tape with the roller. This is why the tape needs to be folded over on itself as shown in FIG. 11 and the head reverses direction to lay tape forward with the roller.

The method described above is highly reliable since the scrap has two chances to be removed from the backing paper, once by the roller as the head is moving in the forward direction, and once while the head is moving in the backward direction, first by the shoe from lines 85 to 89, and then by the roller from line 89 to 91. The partial butt cut stops the propagation of the tape tearing along the lines, and confines the scrap caused by the tearing to the area between the trailing cut 72 of the non-full width course 68 and the butt cut 85. The butt cut 85 also serves as a starting point for the removal of scrap when the shoe is lowered onto the butt cut after moving backward in the scrap area as explained above.

This method described above takes more time to execute than the prior art method since one extra cut needs to be made, and one extra step is used to lay the scrap while the head is moving backward. The method requires extra material to be laid in the scrap area over the prior art method. The amount of extra material required depends on how well the tape sticks to itself. The tackier the tape, the lower the amount of additional material that is needed.

This method provides insurance over the prior art method for having all of the scrap removed. This method is not restricted to triangular non-full width courses, and can be employed with various shapes of non-full width courses. This method works better with tackier material but should work with any tape that is able to be laid with a tape laying head.

FIG. 6 shows the method of the invention used with a parallelogram shaped non-full width course 90. The parallelogram shaped course 90 has a leading edge 91, a trailing edge 92, and an interior edge 93 that is parallel to the edge of the tape. The method of FIG. 6 is similar to the method described in conjunction with FIG. 5, and adds one cut and some additional motion of the tape laying head to the prior art method. A partial butt cut 96 is made to the tape between the non-full width course 90 and the next course 74. The butt cut 96 extends from the tape edge 64 on which the non-full width course is located to a point on the tape that is the same distance from the tape edge 64 as the interior edge 93 of the non-full width course is from the tape edge 64. As with the previous method, this method requires a longer length of tape between the end of the non-full width course and the next course than the prior art method.

The process as shown in FIG. 6 proceeds as follows. The scrap before the non-full width course is begun to be laid in the scrap area at the upstream edge of the tape with the shoe. When the bottom of the compaction shoe is at line 76 and is within a predetermined distance of the non-full width course on the backing paper, the shoe is raised and the roller is brought into contact with the tape. The scrap around the non-full width course is removed from the backing paper up to the head of the next course designated by the dotted line 78.

To make sure that all of the scrap is removed, a second step is used to lay the scrap after the non-full width course 90 in the scrap area. The roller remains on the surface of the scrap area. The tape is driven backward until the laydown area is at line 98, a predetermined distance from the partial butt cut 96. The shoe is extended and the roller is retracted as shown in FIG. 2. The butt cut 96 between the non-full width course 90 and the next course 74 is now under the shoe. The head begins to lay the scrap with the shoe moving toward the non-full width course 90 from the butt cut, in the reverse direction of the normal direction of motion of the head. While the head is moving backward in the scrap area, the tape is driven in the negative direction to rewind the backing paper onto the tape feed reel and to deposit the scrap following the non-full width course onto the scrap area as shown in FIG. 8. Just before the non-full width course is reached, when the shoe reaches the line 99, the head reverses direction to put slack in the tape as shown in FIG. 9. As in the description given above in connection with FIG. 5, slack needs to be put in the tape so that the tape is not pulled off of the surface when the compaction roller is brought down onto the surface. The shoe makes a short forward move on the surface without the tape feed axis moving. This forward movement peels a small amount of tape off of the backing paper on the take-up reel side of the shoe to generate the slack in the tape. The roller is extended and the shoe is retracted as shown in FIG. 10. The tape feed axis is driven backward to remove the slack in the tape and the backing paper on the feed reel side.

The head continues to move forward while the tape drive continues in the reverse direction until the laydown line of the roller reaches the line 100 at the furthest point on the scrap piece so that all of the backing paper which may have scrap on it has passed under the roller. If the scrap piece is short, the entire scrap piece will pop off of the backing paper when the compaction roller is extended. If the scrap piece is long, the scrap is folded under the compaction roller as shown in FIG. 11. The fold line goes across the tape and the tape doubles back on itself. Once this scrap piece has been placed on the scrap receiving surface, the head lifts off of the surface of the scrap area.

The tape is then driven to position the tape to lay the non-full width course on the part. The tape laying head is moved to the part so that the non-full width course can be laid by the shoe in the normal manner.

FIG. 7 shows the method of the invention used to ensure the removal of scrap 105 between two full width courses 104 and 74. In this example, the course 104 begins at the cut line 111, and the course 104 is physically too short for the use of a tail compactor 50. Course 104 will be referred to as a short course. Similar to the method described in conjunction with FIGS. 5 and 6, the method adds one cut and some additional motion of the tape laying head to the prior art method. A butt cut 103 is made across the width of the tape between the two full width courses 104 and 74.

The process as shown in FIG. 7 proceeds as follows. The scrap 105 begins at the cut line 106. The scrap is begun to be laid in the scrap area with the shoe beginning at line 103, and when the bottom of the compaction shoe reaches line 110 and is within a predetermined distance of the full width course on the backing paper, the shoe is raised and the roller is brought into contact with the tape. The scrap is removed from the backing paper by the roller up to the end of the head of the next course designated by the dotted line 78.

To remove the scrap following the cut line 106, a second step is used. The roller remains on the surface of the scrap area. The tape is driven backward until the laydown area is at line 110, a predetermined distance from the butt cut 103. The shoe is extended and the roller is retracted. The butt cut 103 is now under the shoe. The head begins to lay the scrap with the shoe moving toward the cut line 106 from the butt cut 103, in the reverse direction of the normal direction of motion of the head. As shown in FIG. 8, while the head is moving backward in the scrap area, the tape is driven in the negative direction to rewind the backing paper onto the tape feed reel and to deposit the scrap following the short course onto the scrap area. Just before the short course is reached, when the shoe reaches the line 107, the head reverses direction to put slack in the tape. Slack needs to be put in the tape so that the tape is not pulled off of the surface when the compaction roller is brought down onto the surface. The shoe makes a short forward move on the surface without the tape feed axis moving. This forward movement peels a small amount of tape off of the backing paper on the take-up reel side of the shoe to generate the slack 88 in the tape as shown in FIG. 9. The roller is extended and the shoe is retracted as shown in FIG. 10. The tape feed axis is driven backward to remove the slack in the tape and the backing paper on the feed reel side.

The head continues to move forward while the tape drive continues in the reverse direction until the laydown line of the roller reaches the line 108 at the furthest point on the scrap piece 105 from the tape edge 64 so that all of the backing paper which may have scrap on it has passed under the roller. If the scrap piece is short, the entire scrap piece will pop off of the backing paper when the compaction roller is extended. If the scrap piece is long, the scrap is folded under the compaction roller as shown in FIG. 11. The fold line goes across the tape and the tape doubles back on itself. Once this scrap piece has been placed on the scrap receiving surface, the head lifts off of the surface of the scrap area.

The tape is then driven to position the tape to lay the short course 104 on the part. The tape laying head is moved to the part so that the short course 104 can be laid by the shoe in the normal manner. After the short course 104 is laid, the beginning of the next course 74 is laid with the shoe.

The invention has been described in a process in which the scrap is removed from the tape in a single stage laying process, one in which the tape courses are cut and scrap is removed from the tape as the tape is being laid in the part. The invention can also be used in a two stage process in which the tape sections are pre-cut, the scrap is removed, and the processed tape is wound onto a supply reel to be used at a later time. The process of the invention can be used in a two stage process in ensure that all of the scrap has been removed from the tape, although the tape will not be used to fabricate a part until a later time.

Having thus described the invention, various modifications and alterations will occur to those skilled in the art, which modifications and alterations are intended to be within the scope of the inventions defined by the appended claims.

We claim:

1. A method of using a tape laying head for removing scrap from tape and laying the scrap in a scrap area wherein the tape laying head comprises a compaction shoe and a compaction roller for pressing the tape onto a form, wherein the tape comprises fiber tape carried on backing paper and the fiber tape comprises fiber bundles embedded in a resin matrix and wherein the tape normally passes through the tape laying head from a feed reel to a take-up reel, the method comprising the steps of:

1) advancing the tape laying head from upstream to downstream in a scrap area while advancing the tape from the feed reel to the take-up reel to deposit the tape in the scrap area;

2) reversing the tape laying head so that it advances from downstream to upstream in the scrap area while reversing the direction of tape motion through the head from the take-up reel to the feed reel while pressing the fiber tape onto the scrap area; and, 3) applying a butt cut to the scrap to be deposited in the scrap area, the butt cut severing the fiber bundles and the resin matrix but not the paper backing, and the butt cut serving to terminate the propagation of any tears along the longitudinal axis of the scrap that may occur in the fiber tape during step 1 above and serving as a starting point for scrap removal, wherein a portion of the scrap to be removed from the tape is downstream of a non-full width course of tape that is not scrap and is to be laid on the form, and wherein a downstream edge of the non-full width course is formed by a trailing cut.

2. The method of claim 1 wherein the butt cut is positioned on the fiber tape between the non-full width course of tape and the end of the scrap portion located downstream of the non-full width portion.

3. The method of claim 2 further comprising the steps of:
laying the scrap from the region of the non-full width course with the head moving in the forward direction from upstream to downstream with the compaction roller;
laying remaining portions of scrap from the area of the butt cut toward the non-full width course with the head moving in the reverse direction from downstream to upstream with the compaction shoe; and
laying remaining portions of scrap from the area adjacent the trailing cut forming the downstream edge of the non-full width course with the head moving in the forward direction after having first moved in the reverse direction from upstream to downstream with the compaction roller while the tape feed axis is moving from the take-up reel to the feed reel.

4. The method of claim 1 further comprising the steps of positioning the non-full width course along one edge of the tape wherein the non-full width course extends a first distance from a first edge of the tape toward the opposite second edge of the tape, and extending the butt cut only by a distance equal to said first distance from the first edge of the tape toward the second edge of the tape.

5. The method of claim 4 wherein said non full width course has the shape of a triangle.

6. The method of claim 4 wherein said non-full width course has the shape of a parallelogram.

7. A method of using a tape laying head for removing scrap from tape by laying the scrap in a scrap area wherein the tape laying head comprises a compaction shoe and a compaction roller for pressing the tape onto a form along a line called a laydown line, wherein the tape comprises fiber tape carried on backing paper and the fiber tape comprises fiber bundles embedded in a resin matrix, and wherein the tape is supplied from a feed reel and the backing paper becomes wound onto a take-up reel, the method comprising:
performing a first sequence of steps for removing scrap surrounding a non-full width course comprising the steps of laying the scrap before the non-full width course in the scrap area with the compaction shoe with the head moving in the forward direction,
raising the compaction shoe when the bottom of the compaction shoe is within a predetermined distance of the non-full width course on the backing paper,
bringing the roller into contact with the tape, and,
continuing to move the head in the forward direction to lay the scrap with the roller up to the end of the head of the next course,
and performing a second sequence of steps for removing scrap surrounding the non-full width course that was not removed by the first sequence of steps, the second sequence of steps comprising the steps of:
providing a butt cut in the scrap portion of the tape which severs the fiber bundles and the resin matrix but not the paper backing of the tape;
maintaining the roller on the surface of the scrap area;
driving the tape backward until the laydown line is a predetermined distance from the butt cut;
extending the shoe and retracting the roller to position the butt cut under the compaction shoe;
laying the scrap with the compaction shoe moving from the butt cut toward the non-full width course, in the reverse direction of the normal direction of motion of the head;
driving the tape in the negative direction while the head is moving in the reverse direction to rewind the backing paper onto the feed reel and to deposit the scrap between the butt cut and the non-full width course onto the scrap area;
reversing the direction of head movement to put slack in the tape just before the head reaches the non-full width course;
moving the shoe forward a short distance on the surface without driving the tape feed axis to peel a small amount of tape off of the backing paper on the take-up reel side of the shoe and thereby generate the slack in the tape;
extending the roller into contact with the tape and retracting the shoe;
driving the tape feed axis backward to remove the slack in the tape and the backing paper on the feed reel side; and,
moving the head forward while driving the tape in the reverse direction until the laydown line of the roller reaches the point of the non-full width course that is farthest from the edge of the tape along which the non-full width course is located so that all of the backing paper which may have scrap on it has passed under the roller;
whereby the scrap has two chances to be removed from the backing paper, once by the roller as the head is moving in the forward direction, and once while the head is moving in the backward direction;
whereby the butt cut stops the propagation of the tape tearing along the longitudinal axis of the tape, and confines the scrap caused by the tearing to the scrap between the non-full width course and the butt cut, and;
whereby the butt cut also serves as a starting point for the removal of scrap from the tape when the shoe is lowered onto the butt cut after moving backward in the scrap area.

8. A method of using a tape laying head for removing scrap from tape by laying the scrap in a scrap area wherein the tape laying head comprises a compaction shoe and a compaction roller for pressing the tape onto a form along a line called a laydown line, wherein the tape comprises fiber tape carried on backing paper and the fiber tape comprises fiber bundles embedded in a resin matrix, and wherein the tape is supplied from a feed reel and the backing paper becomes wound onto a take-up reel, the method comprising:
performing a first sequence of steps for removing scrap surrounding a non-full width course comprising the steps of laying the scrap before the non-full width course in the scrap area with the compaction shoe with the head moving in the forward direction,
raising the compaction shoe when the bottom of the compaction shoe is within a predetermined distance of the non-full width course on the backing paper,
bringing the roller into contact with the tape, and,
continuing to move the head in the forward direction to lay the scrap with the roller up to the end of the head of the next course,
and performing a second sequence of steps for removing scrap surrounding the non-full width course that was not removed by the first sequence of steps comprising the steps of:
providing a butt cut in the scrap,
laying the scrap with the shoe moving from the butt cut toward the non-full width course, in the reverse direction of the normal direction of motion of the head,
whereby the scrap has two chances to be removed from the backing paper, once by the roller as the head is moving in the forward direction, and once by the shoe while the head is moving in the backward direction, whereby the butt cut stops the propagation of the tape tearing along the longitudinal axis of the tape, and confines the scrap caused by the tearing to the scrap between the non-full width course and the butt cut, and, whereby the butt cut also serves as a starting point for the removal of scrap when the shoe is lowered onto the butt cut after moving backward in the scrap area.

9. The method of claim 8 further comprising the steps of:

driving the tape in the negative direction while the head is moving in the reverse direction to rewind the backing paper onto the feed reel and to deposit the scrap following the non-full width course onto the scrap area.

10. The method of claim 8 further comprising the steps of:

extending the roller into contact with the tape and retracting the shoe; and moving the head forward while driving the tape in the reverse direction until the laydown line of the roller reaches the point of the non-fall width course that is farthest from the edge of the tape along which the non-full width course is located so that all of the backing paper downstream of the non-full width course which may have scrap on it has passed under the roller.

11. The method of claim 8 further comprising the steps of:

reversing the direction of head movement to put slack in the tape just before the head reaches the non-full width course, and moving the shoe forward a short distance on the surface without driving the tape feed axis to peel a small amount of tape off of the backing paper on the take-up reel side of the shoe and thereby generate the slack in the tape.

12. The method of claim 11 further comprising the steps of:

driving the tape feed axis backward to remove the slack in the tape and the backing paper on the feed reel side when the head first starts to move backward.

13. The method of claim 8 further comprising the steps of:

maintaining the roller on the surface of the scrap area when the head first starts to move backward;

driving the tape backward until the laydown area is a predetermined distance from the butt cut; and, extending the shoe and retracting the roller to position the butt cut under the shoe.

14. A method of using a tape laying head for removing scrap from tape between an upstream and a downstream full width course by laying the scrap in a scrap area wherein the tape laying head comprises a compaction shoe and a compaction roller for pressing the tape onto a form along a line called a laydown line, wherein the tape comprises fiber tape carried on backing paper and the fiber tape comprises fiber bundles embedded in a resin matrix, and wherein the tape is supplied from a feed reel and the backing paper becomes wound onto a take-up reel, the method comprising:

forming a butt cut in the scrap portion of the tape which severs the fiber bundles and the resin matrix but not the backing paper;

laying the scrap in the scrap area with the compaction shoe beginning at the butt cut with the head moving in the forward direction;

raising the compaction shoe and lowering the roller into contact with the scrap when the compaction shoe is within a predetermined distance of the downstream full width course on the backing paper;

removing the scrap from the backing paper by the roller up to the end of the head of the downstream course;

leaving the roller on the surface of the scrap area and driving the tape backward until the laydown line is a predetermined distance from the butt cut;

extending the shoe and retracting the roller to position the butt cut under the compaction shoe;

moving the head in the reverse direction from the butt cut to the end of the upstream course to lay the scrap in the scrap area;

driving the tape in the negative direction to rewind the backing paper onto the feed reel and to deposit the scrap following the upstream course onto the scrap area;

reversing the direction of the head to put slack in the tape just before the shoe reaches the upstream course;

moving the shoe forward a short distance without moving the tape feed axis to peel a small amount of tape off of the backing paper on the take-up reel side of the shoe to generate the slack in the tape;

extending the roller and retracting the compaction shoe;

driving the tape feed axis backward to remove the slack in the tape and the backing paper on the feed reel side; and, moving the head forward while driving the tape in the reverse direction until the laydown line of the head reaches the point on the tape where the upstream course occupies the full width of the tape, whereby all of the backing paper which may have scrap on it has passed under the roller.

15. A method of using a tape laying head for removing scrap from tape between an upstream and a downstream full width course by laying the scrap in a scrap area wherein the tape laying head comprises a compaction shoe and a compaction roller for pressing the tape onto a form along a line called a laydown line, wherein the tape comprises fiber tape carried on backing paper and the fiber tape comprises fiber bundles embedded in a resin matrix, and wherein the tape is wound on a feed reel and the backing paper becomes wound onto a take-up reel, the method comprising:

forming a butt cut in the scrap portion of the tape which severs the fiber bundles and the resin matrix but not the backing paper, laying the scrap in the scrap area beginning at the butt cut with the head moving in the forward direction, moving the head in the reverse direction from the butt cut to the end of the upstream course to lay the scrap in the scrap area, driving the tape in the negative direction to rewind the backing paper onto the tape feed reel and to deposit the scrap following the upstream course onto the scrap area, and, moving the head forward while driving the tape in the reverse direction until the laydown line of the head reaches the point on the tape where the upstream course occupies the full width of the tape, whereby all of the backing paper which may have scrap on it has passed under the roller.

16. The method of claim 15 further comprising the steps of:

using the compaction shoe to lay the scrap in the scrap area beginning at the butt cut with the head moving in the forward direction.

17. The method of claim 15 further comprising the steps of:

raising the compaction shoe and lowering the roller into contact with the scrap when the compaction shoe is within a predetermined distance of the downstream full width course on the backing paper; and removing the scrap from the backing paper by the roller up to the end of the head of the downstream course.

18. The method of claim 17 further comprising the steps of:
  leaving the roller on the surface of the scrap area and driving the tape backward until the laydown line is a predetermined distance from the butt cut; and
  extending the shoe and retracting the roller to position the butt cut under the compaction shoe.

19. The method of claim 18 further comprising the steps of:
  reversing the direction of the head to put slack in the tape just before the shoe reaches the upstream course;
  moving the shoe forward a short distance without moving the tape feed axis to peel a small amount of tape off of the backing paper on the take-up reel side of the shoe to generate the slack in the tape;
  extending the roller and retracting the compaction shoe; and
  driving the tape feed axis backward to remove the slack in the tape and the backing paper on the feed reel side.

* * * * *